Figure 1:
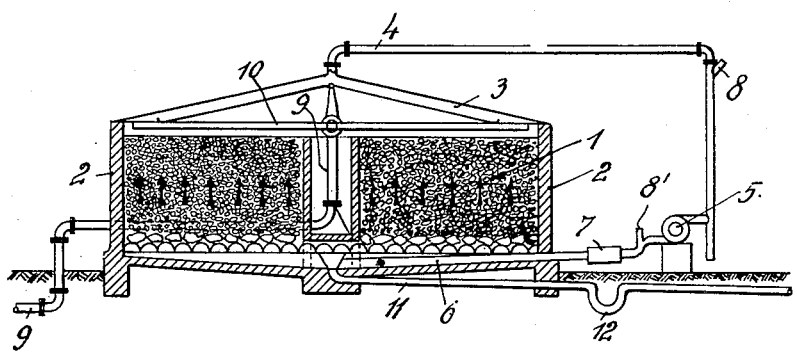

March 9, 1937. H. BLUNK 2,073,441

PROCESS OF TREATING SEWAGE

Filed Sept. 12, 1933 2 Sheets-Sheet 1

Inventor:
Heinrich Blunk,
Carl A. Hellmann,
Attorney

March 9, 1937.  H. BLUNK  2,073,441

PROCESS OF TREATING SEWAGE

Filed Sept. 12, 1933  2 Sheets-Sheet 2

Inventor:
Heinrich Blunk,
Carl A. Hellmann,
Attorney.

Patented Mar. 9, 1937

2,073,441

UNITED STATES PATENT OFFICE 2,073,441

PROCESS OF TREATING SEWAGE

Heinrich Blunk, Essen, Germany

Application September 12, 1933, Serial No. 689,137
In Germany September 14, 1932

2 Claims. (Cl. 210—7)

This invention relates to a process of and apparatus for treating sewage by means of biological percolating filters and consists essentially in the provision of novel steps and means for accomplishing an improved purification and in addition to this, for avoiding certain disadvantages, such as formation of disagreeable odor and production of flies or other vermin on said percolating filters.

Although the processes of purifying sewage by means of biological percolating filters, in a qualitative respect, had so far been equivalent to most processes which employ biological steps in general, the biological percolating filter process has lost in value during recent years in comparison to said other processes. The reason for this consists in the first place in that the percolating filter or filtering bodies which had so far been used offer only limited possibilities as regards their being loaded with impurities, this being due to the specific structure of said bodies and the mode of treatment to which they are subjected, and in the second place in that it had so far been impossible to suppress the formation of odor and the production of noxious vermin. As regards the production of flies or other vermin in particular, practically there were heretofore no known preventatives at all; as a matter of fact, this had repeatedly been confirmed by various authors in the technical literature by statements, such as: "The employment of percolating or filtering bodies is not to be recommended, because odor and flies cannot be prevented". Attempts have also been made to destroy the noxious flies or other vermin by occasionally submerging the entire percolating plant in water or by the addition of chlorin, but regarding the effect and practical value of these steps, there is much disagreement among the experts. To avoid the production of flies, insects or the like has thus remained one of the principal problems arising in the construction and operation of sewage treatment plants; in consequence of this, in Germany as well as in all other countries, well-known and recognized scientists are at work to solve the problem of destroying flies or other vermin produced on the percolating or filtering bodies used in sewage treatment plants.

Besides, a large number of experiments had also been conducted with a view of rendering the percolating filters more suitable for the absorption or reception of the impurities and of improving the economy of the process. Thus, so-called activated sludge had been added to sewage carried through the percolating filters and the latter themselves had been aerated by artificial means. Although some progress may have been attained by using steps or means of this or a similar nature, the steps and means so far used represent only a partial solution of the principal problems arising in connection with sewage treatment. As a matter of fact, the nuisance of odor and especially the insect plague concomitant with the operation of plants of the present kind have heretofore not been effectively mastered.

In contradistinction to known processes of, and apparatus for, the treatment of sewage by means of percolating or filtering bodies, my invention solves a double problem, viz. firstly, the problem of removing the nuisance due to formation of unpleasant odors and to generation of flies or the like, and secondly, the problem of increasing the receptive power of the percolating or filtering bodies, both by very simple steps and means. According to my new process, more particularly, the generated or attracted flies or insects are mechanically carried away from the percolating filter which is enclosed air-tight on all sides by a receptacle and thereupon destroyed. Removal of the flies or insects is accomplished by means of an aerating pipe preferably connected to the roof of said receptacle and by passing scavenging air by pressure or suction, or both, from an air-channel at the bottom of said receptacle, in uniform flow through said aerating pipe and therewith through all parts of the percolating or filtering bodies enclosed in said receptacle. The sub-atmospheric pressure thus generated in the free space above said bodies must be sufficient to overpower the resistance offered against passage of air, said resistance being determined by the height of the layer of percolating bodies and the load at any time imposed thereon by impurities. The insects or other vermin are thus torn by an air-current out of the small channels within the percolating bodies, carried away therefrom and besides, may finally be destroyed within further percolating or filtering bodies especially provided for this purpose. If in such case the waste-gases are carried through liquids containing chlorin, acids, alkalies or the like, besides the flies, the injurious gases may also be rendered innocuous.

It may now immediately be seen that a uniform and at every time regulable scavenging by air of a layer of percolating or filtering bodies which is enclosed all around will simultaneously furnish the possibility of essentially increasing the receptive power of the percolating or filtering bodies. Together with the scavinging air there will be carried away the products separated by micro-organisms, poisonous carbon dioxide present in the interior of the percolating bodies and, in addition, such an amount of oxygen from the air will be brought into action with said bodies in most favorable distribution and contact as is necessary in order to most effectively generate said organisms. If a suitable centrifugal device in the form of a disc or turbine or the like is provided within the free space above the layer of percolating bodies in said closed receptacle and if further care is taken to secure proper atomization and uniform distribution of the sewage throughout the surface of the percolating bodies, the effect will be that, besides thorough degassing by means of the current of air which is likewise uniformly carried through and out of said bodies, the sewage particles will be laden with oxygen as early as before their entrance into the percolating bodies. On account of the uniform passage of scavenging air through the enclosed layer of percolating bodies there will be attained, simultaneously with a proper atomization and distribution of sewage, firstly, a removal of the objectionable odor and insects, and secondly, an essential increase of the absorbing power of the percolating bodies. The fact that the aforementioned effects cannot be attained with the present known processes of purifying sewage by means of percolating bodies is clearly proven by numerous scientific treatises dealing with the problem of removing flies or the like from sewage treatment plants which operate on the principle of percolating or filtering bodies.

Besides the aforementioned advantages I desire to point out that the process and apparatus which according to my present invention is provided with a receptacle enclosing the percolating bodies air-tight all around is likewise suitable for obviating certain drawbacks which are frequently present when operating sewage treatment plants during the winter-months. In order to prevent freezing of the percolating bodies, the latter had been artificially aerated by using preheated air. Although it may at first glance appear that a process of permanently supplying warmed fresh air to the percolating bodies will be uneconomical, a marked advantage of my present process consists in that full economy is secured by regulating the supply of air to the percolating bodies within the closed receptacle, which may be accomplished by means of a fan or compressor. On the basis of experiments it has been found that with the considerable quantity of air suitably passed through the percolating bodies by suction, only a fraction of the oxygen present in said air is needed by the organisms and that it is immediately possible to adapt the composition of said air to all conditions by supplying thereto small quantities of fresh air or pure oxygen. The process may also be carried out in closed circuit flow according to my invention. In such case the costs for the heating of the air during winter-time will be reduced to a minimum. However, during summer-time it may also be of advantage to carry out the process in closed circuit especially if it is desired to remove the flies or vermin by suction. In this case the air, which naturally is not artificially heated, will again force the flies, during its closed circuit motion, from underneath into the percolating bodies which are enclosed all around. The water trickling through the percolating bodies will destroy the insects which may eventually still be alive and wash the same out together with the discharging water into the secondary clarifying plant where they are retained together with the other washed-out organisms and carried into the digestion tank. If a closed circuit process is not desired, the aforementioned fan is caused to act immediately upon the main and preliminary filters, while fresh air is being constantly drawn in from the outside through air channels provided at the bottom of the closed receptacle for the percolating bodies.

Figure 2:
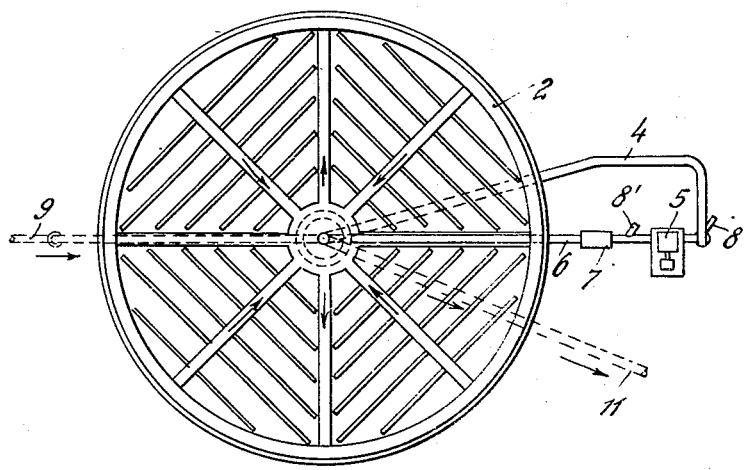
Figure 3:
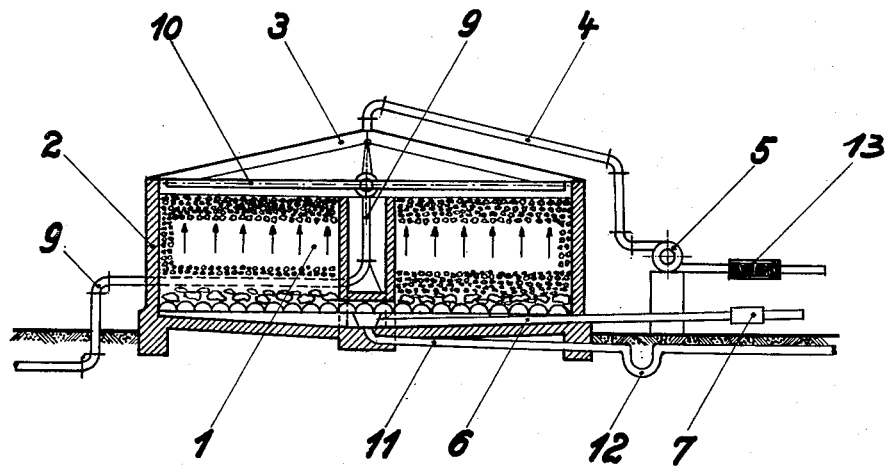
Figure 4:
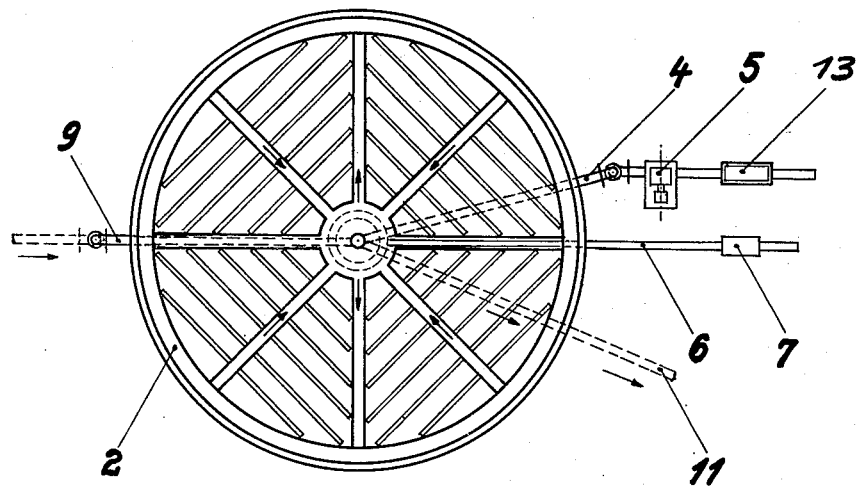

In the accompanying drawings I have represented solely by way of example, a percolation plant operating according to the principles of my invention for carrying out the aeration in a closed circuit way, Fig. 2 showing said plant in longitudinal vertical section Fig. 2 in plan, and Fig. 3 showing a longitudinal vertical section and Fig. 4 a plan of a percolation plant washed with fresh air.

Referring more particularly to the drawings, the biological percolating or filtering body or layer 1 is firmly enclosed by a wall 2, while a roof 3 is associated with said wall to form the hereinabove mentioned fully closed receptacle for the percolating layer or bodies. The roof 3 is provided at its top with an aperture to which is connected the suction-pipe 4. The fan 5 serves to draw the air by suction from the percolating bodies through pipe 4 and now forces said air in closed circuit motion through the conduit or pipe 6 into the bottom of the layer 1 of percolating bodies, whence said air ascends within said bodies in most uniform distribution therein. A heating resistance 7 or the like is inserted into the return pipe 6, said resistance serving for preheating the scavenging air during winter-time. Through the valves 8 and 8' pure air may be drawn in or used air discharged, respectively. The sewage is supplied through pipe 9 to a water-distributor which is preferably a centrifugal device in the form of a disc or turbine 10. A water seal or trap 12 is provided in the discharge pipe 11 for preventing access of air to the percolating bodies.

A percolating plant operated by fresh air differs from a plant operating on closed circuit principle only that the return pipe 6 for the air is interrupted and the pressure end of the fan 5 connected to a preliminary filter or percolating body 13, while the air conduit leading towards the percolating bodies is now connected with the outer air. Evidently, instead of passing the scavenging air through the percolating bodies by suction said air may also be passed through said bodies by pressure.

I claim:

1. Process for treating sewage in a hermetically enclosed percolating body, which comprises passing the sewage through said body, passing an air current upward through the enclosure from the bottom, uniformly distributing the air over the percolating body and thereafter discharging it as a closed air stream containing impurities and insects, and treating said air streams to destroy said insects before discharging the air to the atmosphere.

2. Process for treating sewage in a hermetically enclosed percolating body, which comprises passing the sewage through said body, drawing air by suction from the top of the enclosure upward through the bottom by means of a fan, distributing it uniformly over the percolating body and thereafter forwarding it as a closed air stream containing impurities and insects, and treating said air streams to destroy said insects before discharging the air to the atmosphere.

HEINRICH BLUNK.